United States Patent [19]

Mauger

[11] 4,014,232
[45] Mar. 29, 1977

[54] DIE-SET ASSEMBLY

[75] Inventor: David W. Mauger, Thiensville, Wis.

[73] Assignee: Clevepak Corporation, New York, N.Y.

[22] Filed: Oct. 31, 1974

[21] Appl. No.: 519,671

[52] U.S. Cl. .................................. 83/144; 83/559; 83/563; 83/618; 83/624; 83/628; 83/698; 93/58.3; 100/18

[51] Int. Cl.$^2$ ...................... B26D 7/18; B26D 5/08

[58] Field of Search .............. 93/59 PL, 59 R, 58.3, 93/37 R; 100/18; 83/700, 559, 561, 618, 624, 628, 563, 145, 50, 698, 701, 699, 144, 619, 620, 621, 622, 562; 76/107 R, 107 C

[56] References Cited

UNITED STATES PATENTS

| | | | |
|---|---|---|---|
| 860,266 | 7/1907 | Summers | 83/619 |
| 2,163,923 | 6/1939 | Vail et al. | 93/37 R |
| 2,259,320 | 10/1941 | Novick et al. | 83/563 X |
| 2,371,565 | 3/1945 | Whistler et al. | 83/620 |
| 2,930,271 | 3/1960 | Whistler | 83/700 X |
| 2,996,025 | 8/1961 | Georgeff | 83/701 X |

Primary Examiner—Othell M. Simpson
Assistant Examiner—W. D. Bray
Attorney, Agent, or Firm—Rogers, Eilers & Howell

[57] ABSTRACT

A partition slotting machine having a punch and die assembly built as a unit to be separable from the machine for repair, replacement and adjustment of punch, die and operating parts away from the machine, so that the machine may continue operating by installation of a substituted pre-assembled punch and die unit during such servicing. The separable unit includes the die bed with dies adjustably positionable thereacross, a press head movably connected to the die bed and containing punches adjustable positioned thereacross to mate with the dies, and parts of a press head moving mechanism involved in adjusting the position of the press head relative to a drive shaft on the machine which drive shaft is coordinated with other machine functions.

12 Claims, 4 Drawing Figures

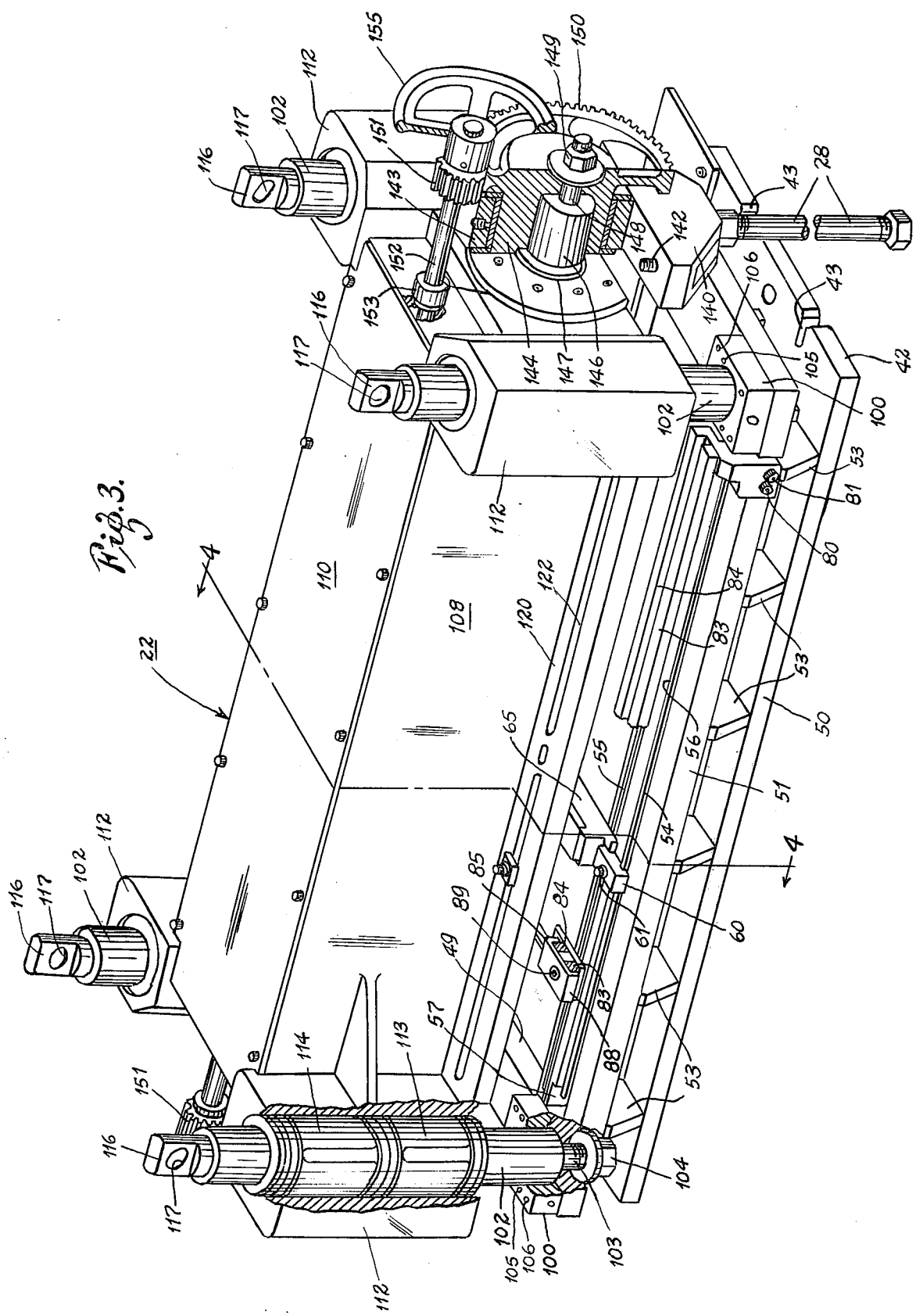

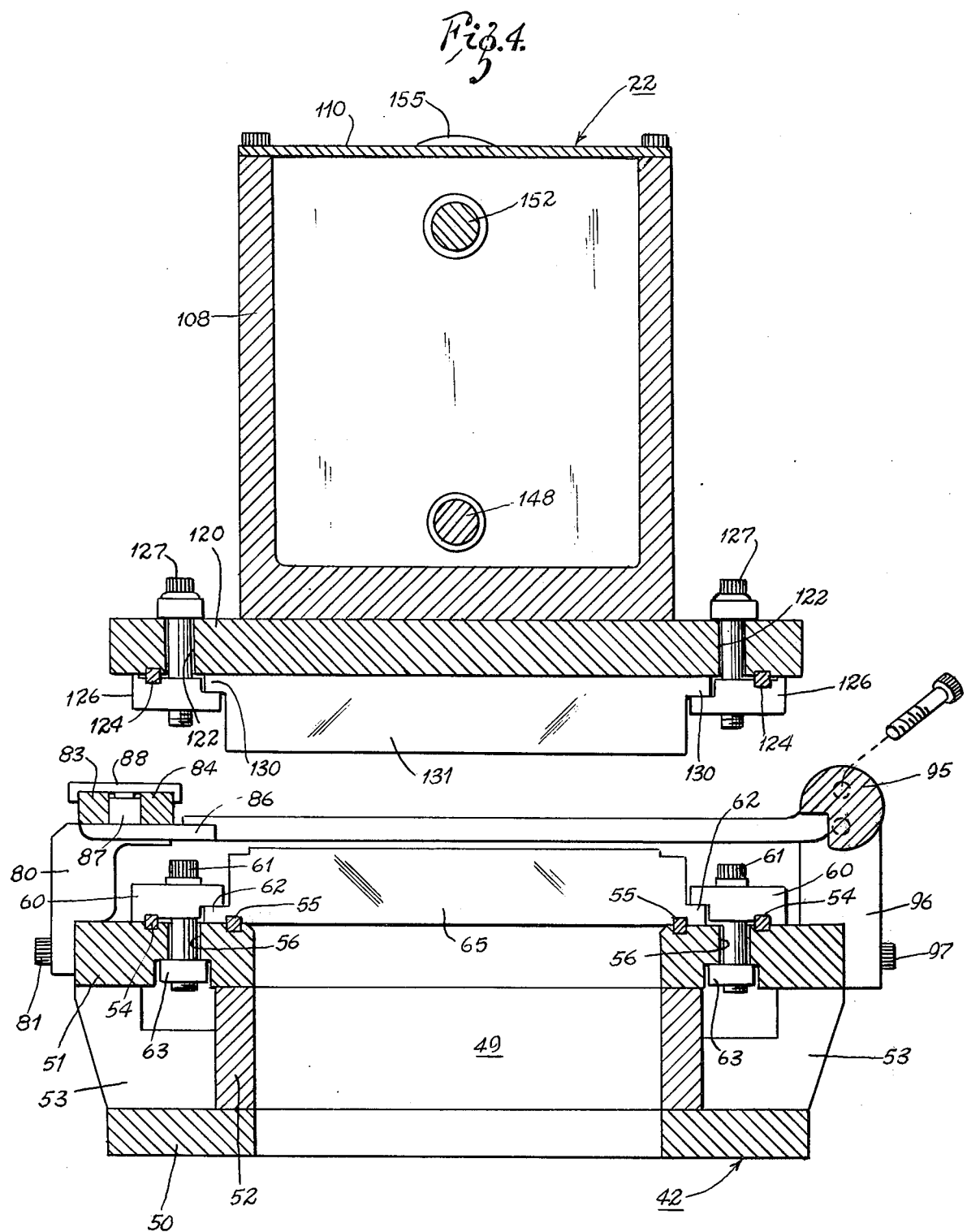

DIE-SET ASSEMBLY

BACKGROUND AND OBJECTIVES OF THE INVENTION

This machine is an improvement upon a former machine, that in itself was an outgrowth of the machine of Vail and Dauber Pat. No. 2,163,923. In the former machine, the die and punch mechanism is built onto the machine frame in a way that requires a piece-by-piece type of assembly and dis-assembly. Replacement of punches and dies is difficult as it requires either dis-assembly of the assembly, or manipulation of parts in very confined spaced. The former being complex, the punches and dies are normally replaced and set without removing any machine parts, but within a very confined space.

In the former machine, disconnection of the drive mechanism between the press head and the machine involves at least partial dis-assembly of the adjusting mechanism for pre-positioning the press head with respect to the machine shaft that coordinates the punch operation with the other machine functions. In the present machine a simple connecting means in provided that does not dis-assemble the adjusting means when the entire punch press and die apparatus is removed as a unit.

In the former machine punches and dies are serviced or replaced on the machine. The positioning of punches and dies for proper interfit is done by spacing and clamping the dies in the machine, the punches are then fitted into the dies, and the press head lowered by hand manipulation to engage the punches, which are then clamped into position on the head. This procedure, performed on the machine, requires long down time.

In the present machine the punch press and die bed are detachable from the machine as a unit, wherein the punches are mounted for movement to and from the dies. Hence, the entire positioning and adjusting of the punches and dies can be made away from the machine. Meanwhile the machines can be operating with a substituted die assembly. The down time of the machine is reduced by this means from a matter of hours to one of minutes.

The present machine employs four corner columns for sliding support of the press head, as opposed to two medially arranged columns. The present arrangement not only affords greater rigidity and strength, but also provides a strong means to which lifting hooks can be attached for removal of the die-punch assembly unit. In addition, it affords room to contain an adjustment shaft within a box beam structure, that was externally exposed in the former machine.

Other improvements over the prior machine include mounting of individual parts for better access. Also the present machine employs a shaft for locking up an adjusted position that extends from side to side of the machine, and provides for loosening on the operator end of the shaft, without necessitating loosening the other side.

The broad object of this invention is to provide a die-set assembly (or sub-assembly) for a partition-making machine that can be quickly removed and replaced as a unit without detailed disassembly of the machine. More specifically, the die set assembly must include as a unit separable from the machine, the dies and punches, their adjusting parts, the strippers and their adjustments, the connecting means between the movable press head holding the punches, and the fixable base holding the dies, and preferably such parts of the drive mechanism as will afford an easy and quick disconnection of the drive mechanism to enable the die assembly to be removed. The foregoing features require not merely that the die and punch parts be separable from the rest of the machine, but also that they be separable as a unit; and since they form a unit, they must possess inherent strength and rigidity.

As noted the die-set assembly must also be readily connectable and interconnectable with the operating mechanism of the machine. A sufficient part of the drive mechanism is incorporated into the die-set assembly to permit the press head to be raised and lowered, thereby to check the positioning of the punches and dies before the assembly is mounted on the machine. This enables these parts to be adjusted when fully accessible.

In order to give greater strength and rigidity to the sub-assembly, and to provide surer and more accurate interfit of the punches and dies, the die-set assembly includes four massive columns securely attached to the base, and upon which the punch press head is slidably mounted through ball bushings. These columns also project from the top of the machine and provide eyes to receive lifting hooks by which the die-set assembly may be lifted. A mounting means that readily accommodates slightly variant positions of the columns and their bearings on the base, is provided.

The die-set assembly includes an adjusting means that extends across the assembly and is operable from the operator side. Having the same adjusting means operable from one side of the machine, in place of separate means on each side, prevents uneven adjustments of the two ends of the head, yet the operator can adjust from the one side.

Other features and objects will appear hereafter.

IN THE DRAWINGS

FIG. 3 is an isometric view of the die set assembly; and

FIG. 4 is an enlarged sectional view on the line 4—4 of FIG. 3.

PREFERRED EMBODIMENT OF THE INVENTION

Figure 1:
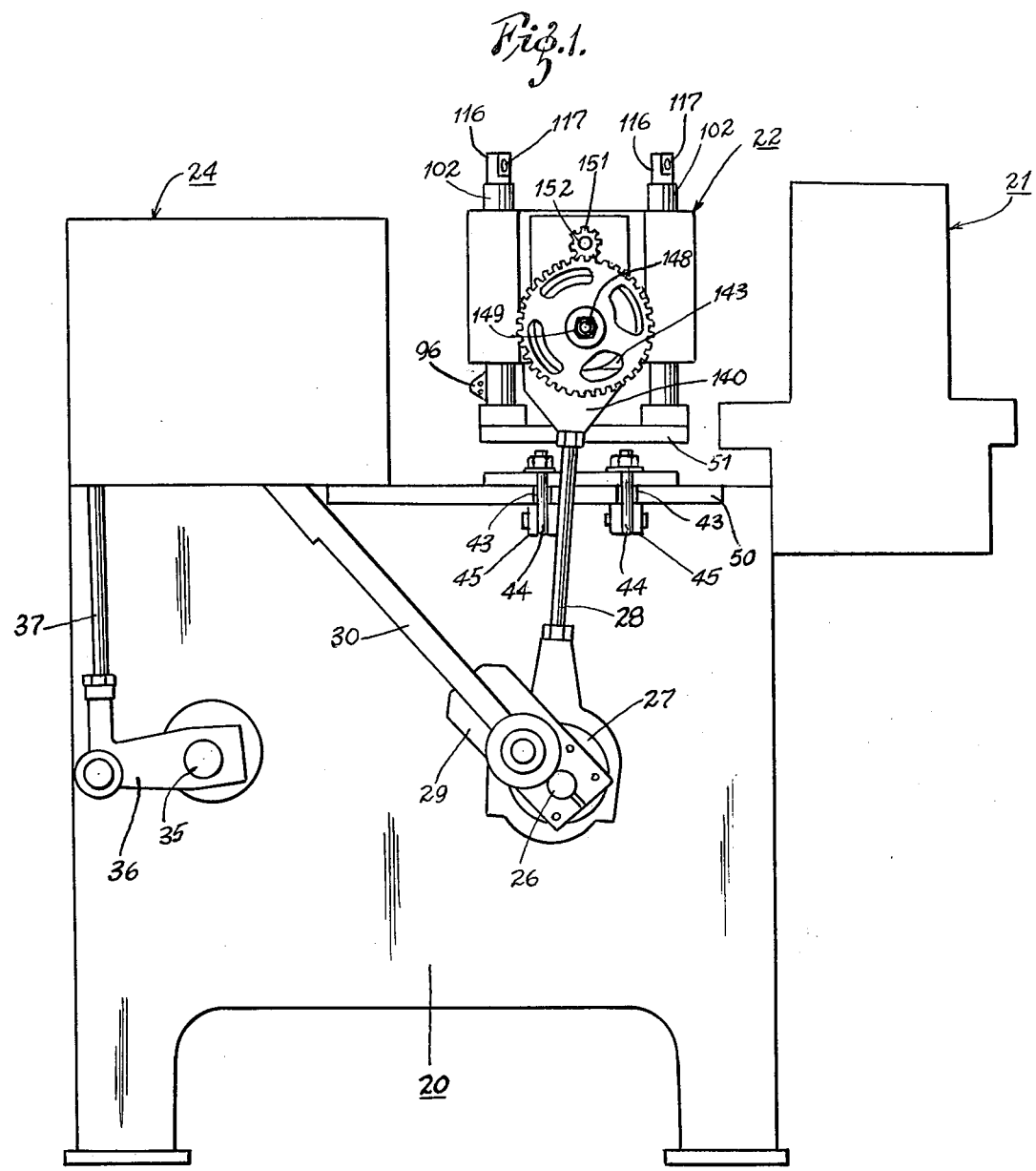
FIG. 1 is a side elevation of a machine incorporating the present invention.

It can be seen that this is basic components in a Vail and Dauber type machine such as that disclosed in U.S. Pat. No. 2,163,923, although it is here illustrated in connection with a strip making operation rather than one including a partition assembler. This is done for simplicity of the present description, as the die-set assembly can be used in both combinations, and as will be apparent, in other combinations.

The machine has a main table or support 20 over the top of which paperboard web is fed, as through an initial guiding and edge trimming system 21 into a die-set assembly 22 of the present invention, where the paperboard is slitted with a plurality of elongated slots of the kind illustrated in the Vail and Dauber patent. The slitted web is fed thence to a strip feeding and cutting mechanism 24 which may take the form shown in the Vail and Dauber patent.

The machine is power-driven, having a power shaft 26 driven by suitable motor means at a selected speed.

The shaft 26 extends across the machine support 20, and at each side of the machine rotates an eccentric 27 at the front side of the machine and a like eccentric 27' at the back side. The eccentrics reciprocate pitmans 28 and 28' that bring the punches and dies together as will appear.

There is also a crank 29 rotated by the shaft 26 at the front side to operate a rack 30 that draws the web across the dies to the cutting mechanism that cuts the then slotted web into partition strips. The cutting mechanism is operated by a shaft 35 that rocks cranks 36 and 36' on opposite sides of the machine to reciprocate a pitman 37 that operates a cutting blade so that slotted strips or partitions are delivered to the left of the machine. An appropriate conveyor or other receptacle is mounted thereat to receive the strips. In case of the machine that also assembles the strips, the cutter and delivery may be arranged as in the Vail and Dauber patent. The shafts 26 and 35 are coordinated to provide synchronized operations of the punches, the feed, and the cutting.

Considering the die-set assembly 22 in detail, we first observe that it has a base 42 adapted to fit onto the top of the main machine support or frame 20. It has notches 43 that receive swivel bolts 44 swiveled on pins attached between ears 45 depending from and integral with the machine frame 20. When the bolts 45 are swiveled upwardly into the notches 43, nuts 46 on the ends of the bolts 44 can be tightened down against appropriate washers to secure the base 42 firmly but removably onto the main support 20. The entire die-set assembly is mounted on and supported by this base 42.

The die-set base 42 comprises a hollow frame surrounding a rectangular opening 49. It is formed from two vertically spaced rectangular frame elements 50 and 51 on opposite sides of an intermediate spacer 52. The spacer 52 has projecting ledges 53 spaced around it to increase strength and rigidity. The opening 49 is defined by openings in the upper and lower plates 50 and 51 and the intermediate spacer 52.

The base 42 comprises a die bed that is adapted to support a plurality of dies. The dies may be of the type shown in the Vail and Dauber patent. This upper plate 51 has two straight inset spaced track or guide members 54 and 55 across its inlet side and similar members across its outlet side. (The inlet or upstream side is from the left in FIGS. 2, 3 and 4.) Between each pair of the track inserts 54 and 55 there is an elongated slot 56 through the plate 51 extending from side to side of the machine. At one end each slot 56 is enlarged (FIG. 3), at 57.

Typical die clamps 60 are grooved to fit over and slide along the track 54, at the inlet and outlet sides of the base 42. These tracks 54 hold the clamps against twisting when the nuts 61 are tightened, which could displace the dies. Each die clamp has a bolt 61 extending through the die clamp and the slot 56 to receive a nut 63 that is non-rotatably received in a lower enlargement of the slot 56. These bolts can be tightened down from above to fix the clamps in laterally selectable positions. In the lateral adjustments of the dies, clamps are guided along the tracks 54, and are secured by their grooved engagement with the track or guide member 54 against slippage during operation of the machine. These die clamps may be quickly removed from the machine when they are loosened and slid to the enlarged openings 57.

The die clamps 60 have overhanging inner edges that can engage over lower flanges 62 along the upstream and downstream edges of a die 65 to clamp the die in place. Each die has at least one groove to receive a rib slide 55 and be positioned thereby.

A number of such dies are disposed across the machine, although only one is illustrated in FIGS. 1 and 4. They are locatable at spacings appropriate to the dimensions of the partitions to be slotted.

The base 42 also supports tracks for the mounting of stripper bars above the dies. At each side of the forward or inlet end of the base there is a bracket 80 attached to the edge of the base by socket screws 81. As shown in FIG. 4, a bracket 80 extends down the side edge of the upper plate 51 of the base 42, then over the top thereof and rearwardly to support two track members 83 and 84 that extend in parallel across the machine from bracket to bracket. A plurality of stripper bars 85 are clamped onto and supported on the two tracks 83 and 84 and extend from near the inlet to the outlet of the dies 65. Each stripper bar is connected rigidly to a plate 86 that extends under the two tracks 83 and 84 and has a squared plug 87 fitting and sliding laterally between the two tracks. A clamp plate 88 extends across the two track plates and has socket screw 89 that extends into the plug 87 so that when tightened, it firmly clamps the supporting plate 86 and its stripper bar to the two tracks 83 and 84. These two tracks are sufficiently far apart and rigid enough to support the stripper bar 85 in cantilever fashion. The bars 85 extend across the opening 49 and at their downstream ends fit into a notch in a three-quarter round guide member 95 that extends across the machine and is supported on two brackets 96 secured by socket screws 97 at opposite sides of the downstream end of the base 42. It will be seen that the bottom edges of the stripper bars 85 fit with the round undersurface of the rounded guide 95 so that when the web comes through the machine from left to right in FIG. 4, it can go under the stripper bars and then be turned upwardly around the round guide 95.

There are a number of stripper bars across the machine, preferably enough to dispose one between each punch and die combination. As will appear, the stripper bars prevent the web from being lifted by frictional attachment to the punch when the punch rises after a punching operation is completed.

The foregoing parts are on the die bed or base 42.

A punch assembly is mounted movably upon and secured to the die-assembly base 42. To this end the base 42 has four base blocks 100, one held in place by appropriate socket-type cap screws at each corner of the upper plate 51. Each block 100 has a cylindrical hole through it to receive and hold a bearing column 102 in upright condition. As shown in FIG. 3, each bearing column has a threaded and reduced extension 103 on its lower end that passes through a somewhat larger hole through the plate 51 to receive a hex nut 104 below the plate 51. With the columns 102 in place in the press head to be described, the extensions 103 fit into the enlarged holes in the base. Holes are drilled through the blocks 100 and the plate 51, and dowels 105 inserted to position the parts. These holes are drilled and tapped to receive cap screws 106 to secure the columns. This arrangement permits the columns 102 to be firmly supported and firmly attached in position on the four corners of the base 42, but to be removed and quickly replaced in precise locations.

These columns 102 support the punch press assembly. This has a channel section 108 closed by a top cover 110 bolted thereto. At each corner of this channel section 108 there are integral bearing supports 112 (the channel member and bearing supports may be a single casting), the bearing supports having vertical passages through them in which are mounted ball bushings 113 and 114. The ball bushings slidably receive the columns 102 and provide for very accurate vertical movement of the entire punch assembly, with minimal friction. The columns 102 project above the ball bushings and the bearing supports 112, and have flattened ends 116 with holes 117 therethrough. By means of these holes, as will later appear, the entire punch and die assembly can be lifted by block and chain from the machine for replacement as a unit. The unitary channel-shaped member 108 and its bolted top cover 110, with the four bearing supports 112 along with the secure mounting of the columns 102 in the base 42, provide a very strong, rigid assembly.

A plate 120 is secured as by welding or bolting firmly to the bottom of the channel section 108 between the pairs of sleeves 112 at opposite sides of the machine. As shown in FIGS. 3 and 4, the plate 120 thus extends forwardly and rearwardly from the channel section 108 parallel to the base plate 51. The plate 120 is provided with slots 122 across its forward and rearward edges beyond the channel member 108. Below its upstream and downstream edges it has a track or guide member 124 inserted and secured to it.

Each track or guide member 124 secures a punch clamp 126 similar to the die clamps 60, slotted to ride on the track 124, and firmly held by a cap screw 127 that passes through the slot 122 and is threaded into the clamp 126. Each clamp has an overhanging ledge that engages over a complementary flange 130 on the edge of the punch member 131. These clamps secure the punch sets to the press head, and the track ribs 124 prevent twisting of the punches when the screws 127 are tightened, which could shift the punches. They provide for adjusting the positions of the punches across the machine to register with the dies in the selected positions of the latter.

As will be understood, a number of such punches are provided across the machine corresponding to the dies. However, as stated in earlier patents, the punch can be selected at a proper length to give the depth of slot desired in the partition to be made, the die having a length equal to the greatest of such prospective slots.

As heretofore stated, the drive of this mechanism is obtained by the pitmans 28 driven by the eccentrics 27 on opposite sides of the machine, the eccentrics being rotated by the shaft 26. Only one need be described in detail. The upper end of each pitman is adjustably mounted in a head 140 into which it threads and is secured by an appropriate lock nut as shown. The head 140 is removably bolted by screws 142 to a bearing block 143 flat across the bottom, and having a cylindrical opening through it to receive an adjusting eccentric 144. As illustrated, the eccentric 144 has a peripheral groove to receive and hold the split bearing block 143.

Also in association with each side of the machine, each eccentric block 144 has a cylindrical recess to receive the end of a cylindrical boss 146 that is eccentric with respect to the cylindrical periphery of the block 144. This cylindrical boss is unitarily joined to a flanged support 147 held by screws to the end wall of the channel member 108. The eccentric 144 extends over the end of the boss 146, to surround a shaft 148 that extends across the box member 108 and projects from both bosses 147. Nuts 149 press the eccentric blocks 144 against the bosses to retain them in adjusted positions. As the pitmans 28 move up and down with a rocking motion developed by the eccentrics 27, the heads 140 and the bearing blocks 143, acting through the eccentric blocks 144, lift and lower the press head by their embracing of the bosses 146. The drive is transmitted thus simultaneously and equally at both ends of the press head.

Each eccentric block 144 extends axially outwardly beyond its bearing block 143 and has a spur gear 150 integral with it. The spur gear 150 in turn meshes with a pinion 151 on a shaft 152 that is supported in bearings 153 in the opposite ends of the U-shaped member 108. The shaft 152 has a handle 155 on its end, preferably with one on each end. When the shaft 152 is turned by its handle, the eccentric block 144 is turned which raises or lowers the shaft 146 and hence the punch subassembly with respect to any given position of the pitmans 28.

OPERATION

The die assembly in its normally sub-assembled condition as a unit, includes what is shown and intended in FIG. 3 except that the pitman 28 and head 140 are not normally a part of it, but usually are retained as part of the machine.

The die sub-assembly of the present invention therefore comprises a die-supporting base or bed that can support a number of dies at adjustable positions across the machine, and an appropriate number of stripper bars, likewise adjustable across the machine. The sub-assembly also includes the press head and punch sub-assembly attached to the die sub-assembly. The punch assembly includes the punches in number and positions corresponding to the number and position of the dies. It includes the vertically reciprocable mounting of the press head on the columns 102, and the adjustment parts of the drive mechanism.

In the initial assembly and set-up of the machine, the punches and dies are separately installed on the die assembly at a work stand where the parts are all readily accessible. In this separate assembly, the press head has normally already been mounted with its columns 102 onto the base 42, and the adjusting mechanism connected to the handle 155 has all been connected. With the press parts in this condition, the handle 155 is turned manually until the press head 108 is lifted a satisfactory distance to separate it from the base.

The next step in the separate assembly of the dies is to mount the dies and strippers onto the base 42. Since the tracks formed by the track or guide members 55 extend all the way across the base, the dies 65 can engage the track members 55 at any locations from side to side of the machine, so that they can be positioned to suit the desired spacing of the slots to be cut. When the dies are accurately positioned, the screws 61 are tightened onto the die clamps 60, the tracks formed by the track or guide members 54 preventing the die clamps from twisting during tightening and displacing the accurately set dies. The strippers are set, and their clamps 88 tightened to dispose a stripper between each pair of dies.

The punches 131, apart from the press head, are then inserted into the dies. The punch clamps 126 being loose and to one side of the punches, the wheel 155 is then turned (the nut 149 having been loosened), and the press head 108 lowered manually until the plate 120 engages the tops of the punches 131. With the punches still engaged in the dies, the punch clamps 126 are positioned to secure the punches and the screws 127 are tightened, the engagement of the punch clamps 126 with the tracks 124 preventing twisting of the clamps and displacing of the punches during the tightening of the screws 127. Thereafter, the press head 108 can be elevated and relowered manually to check the interfit of dies and punches.

It is necessary to see that the punches properly engage the dies and interfit therewith to the proper extent as the pitmans cycle. This adjustment is obtained by having the nuts 149 on the ends of the shaft 148 loose, and then by turning a wheel 155 at one end of the shaft 152. This action rotates the pinions 151 and the gears 150, thereby simultaneously angularly displacing the eccentric blocks 144 on the bosses 146 to raise or lower the press head and the punches with respect to the position of the pitmans 28 and 28'. At this time the pitmans should be located in their lowest position, corresponding to the maximum interfit of the punches and the dies. The wheel 155 is turned until the interfit is proper. When this adjustment is completed, the nuts 149 are re-tightened, bearing on their washers to fix the blocks 144 and the bosses 146 firmly together in their adjusted positions. With reasonable tolerances in the machine and power drive, the foregoing can be done on the test stand.

When the foregoing die assembly is properly and completely adjusted and set up, with the dies, punches and stripper bars in proper positions, a block and tackle is employed, with hooks placed into each of the holes 117 in the several columns 102. Since these columns are very strong and very rigidly secured to the base 42 and are also well supported against lateral displacements by the bearings 113 mounted in the sleeves 112 that are integral with the rigid channel press member 108, a single block and tackle with four chains can be used to pick up the die sub-assembly as a unit and move it onto the top of the machine, as shown in FIG. 1. When it is properly positioned on the top of the machine 20, the bolts are swung up to interfit into the notches 43 in the base 42 of the die sub-assembly. When the nuts 46 are then tightened down, the die is held firmly in place on the machine, between the infeeding mechanism 21 and the cutting or assembly mechanism 24. In this alignment, the proper positioning of the head 140 of the drive mechanism below the bearing block 143 must be attained, after which the cap screws 142 are tightened to secure the bearing block 143 to the head 140.

When the foregoing is completed, the appropriate electrical and air lines are connected. They have not been shown here. The machine is then ready for operation.

Figure 2:
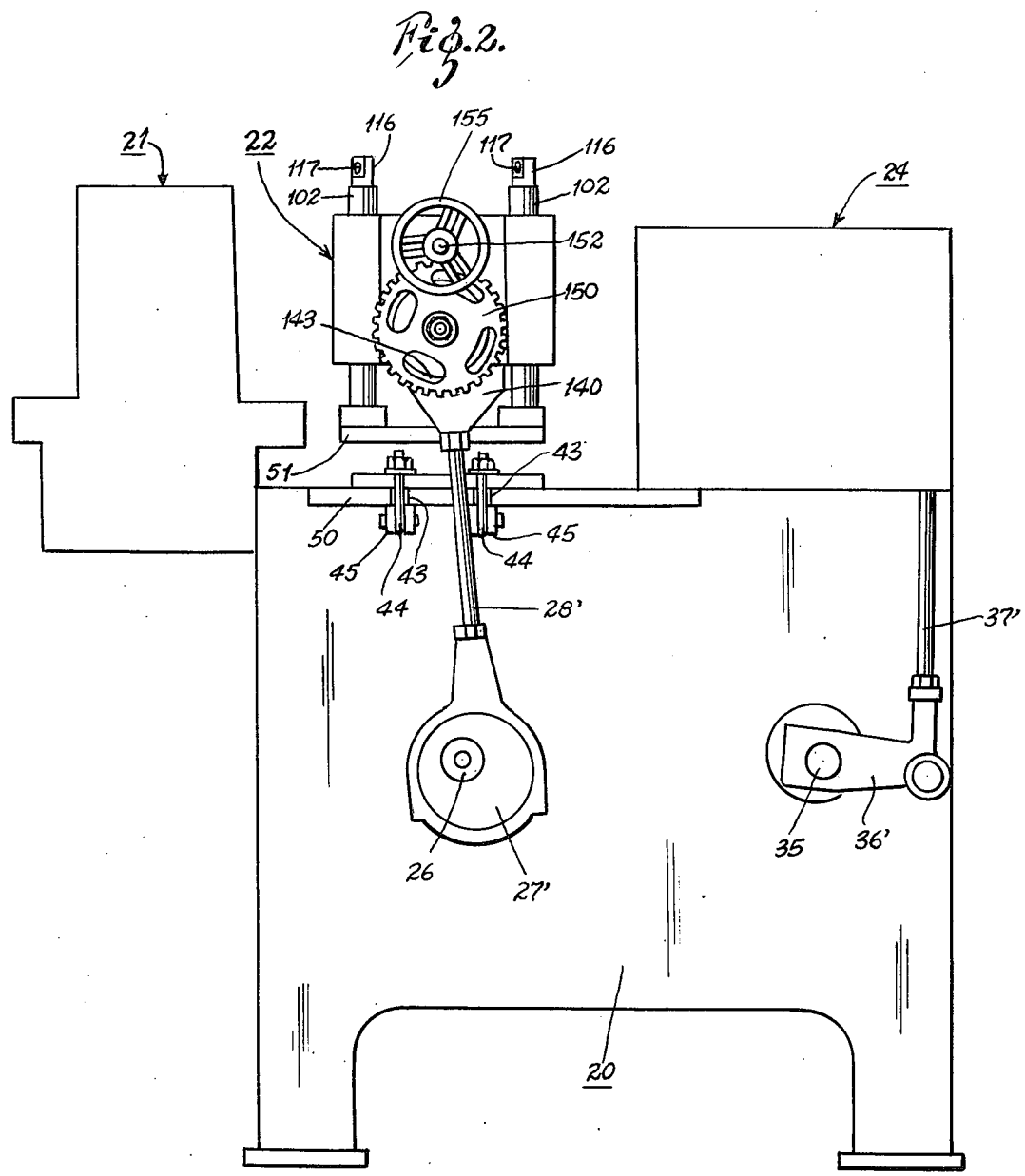
FIG. 2 is a back side elevation of the machine.

The paperboard web, such as corrugated material, is then fed intermittently from the left side of FIG. 2 beneath the stripper bars 85 and over the dies 65 by the shaft 26 and the rack 30 in a manner known in the art, for example, in the Vail and Dauber patent. The web is drawn by the cutting section 24 forwardly in the direction indicated. Since it is under tension across the dies and is elevated downstream of the dies, it is guided by the rounded outlet bar 95.

In coordination with the feed mechanism and the cutting mechanism, the shaft 26 cyclically lowers the pitmans 28 and 28', causing the press head and punches to be lowered. The punches cut out slots in the web, parallel to the direction of web movement, the slots being spaced apart distances appropriate to the partitions being made. Then the press head is raised, lifting the punches from the dies. The stripper bars on each side of the dies, above the web, prevent the web from being carried up with the punches, and so strip it from them.

While the punches and dies of the present machine can be changed and re-positioned while the sub-assembly is on the machine, as in former machines of prior art, it is a great advantage to be able to change the die sub-assembly entirely by loosening eight bolts and the power, oil and air connections. Down time is greatly reduced, as the machinest can rapidly substitute another pre-set die assembly for one on the machine, and then service the removed assembly while the machine is operating.

As wear on a particular die assembly takes place over an extended period of use, the adjusting wheel 155 may be used to compensate for the wear by adjusting the degree of penetration by the punch sets. This type of adjustment is adapted into the present removable die arrangement.

Various changes and modifications may be made within this invention as will be readily apparent to those skilled in the art. Such changes and modifications are within the scope and teaching of this invention as defined by the claims appended hereto.

I claim:

1. In a unitary punch and die unit separable as a unit from and adapted to be mounted on a machine on which machine there is power operated drive means, the separable unit comprising: a base; die-holding means extending across the base to support dies in different selected positions across the base; a press head overlying the base and having punch holding means also extending across the base to support punches adjustably to register with the dies; connecting and guiding means to connect the base and press head together as parts of the unit for movement toward and from each other to enable a punching operation to be performed; means in the unit for selectively moving the press head toward and from the base; means on the press head for connection with the power operated drive means for moving the press head when the unit is mounted onto the machine, the said means for connecting being readily disconnectable; and connecting parts for use in quickly mounting the unit onto a machine.

2. In the unit of claim 1: the means for connection also comprising connections at opposite sides of the unit so that the press head can be moved at both ends simultaneously.

3. In the unit of claim 1: the means for selectively moving the press head incorporating adjusting means attached to each side of the unit to adjust the position of the press head relative to the drive means, so that it may be coordinated with other machine functions.

4. In the unit of claim 3: the adjusting means including bosses extending from opposite sides of the press head; eccentric blocks rockably mounted on the bosses, bearing blocks around the eccentric blocks connectable with the drive means; and means to rotate the eccentric blocks between the bosses and the bearing blocks.

5. In the unit of claim 4: the means to rotate including a shaft extending from side to side of the machine, and connected to rotate the eccentric blocks at both sides of the press at once.

6. In the unit of claim 5: the connections between the shaft and the eccentric blocks comprising gears.

7. In the unit of claim 1: the base having corner columns secured to and upstanding from it, the press head having a medial section with united corner bearing supports and bushings mounted slidably upon the columns, the columns having parts projecting upwardly above the bearing supports and having means on their projecting parts by which they, and the entire unit, may be lifted.

8. In the unit of claim 1: the die holding means comprising die clamps; stripper bars also held adjustably on the base for movements to different positions across the base; the punch holding means on the press head having means extending across the press head to slidably receive punch clamps at its inlet and exit ends to clamp punches on the base for mating with the dies, the die clamps and punch clamps being made accessible by removal of the assembly as a unit from the machine.

9. In the unit of claim 8: a machine table upon which the die assembly unit is mounted; the machine having projecting parts mounted closely adjacent the unit as mounted, rendering access to the punch and die clamps difficult when the unit is in place, the removal of the unit permitting a substitute unit to be installed, reducing down time.

10. In the unit of claim 1: the press head comprising a channel member extending across the machine, a closure therefor; four integral corner bearing supports on the channel member; four columns rising from the base; the bearing supports surrounding the columns, with antifriction bearings between the columns and the bearing supports.

11. In the unit of claim 4: with means to secure the eccentric blocks in adjusted positions.

12. In the unit of claim 11: the means to secure the blocks including a member extending through both bearing blocks and having thrust means at its opposite ends by either of which it may be tightened or loosened from both blocks.

* * * * *